United States Patent [19]
Forcella

[11] 3,981,660
[45] Sept. 21, 1976

[54] APPARATUS FOR CUTTING SLICES OF SEMI-FROZEN FOOD PRODUCTS
[75] Inventor: Peter W. Forcella, Los Gatos, Calif.
[73] Assignee: FMC Corporation, San Jose, Calif.
[22] Filed: Feb. 12, 1975
[21] Appl. No.: 549,264

[52] U.S. Cl. .............................. 425/232; 83/647.5; 83/647; 425/311
[51] Int. Cl.² ....................... A23G 9/28; A23G 9/14
[58] Field of Search ............ 425/311, 232; 83/647, 83/647.5, 168, 651.1

[56] References Cited
UNITED STATES PATENTS

| | | | |
|---|---|---|---|
| 1,775,189 | 9/1930 | Braybon et al. | 425/311 X |
| 2,090,095 | 8/1937 | Bainbridge | 425/311 |
| 3,445,889 | 5/1969 | Barwell et al. | 425/311 X |
| 3,646,894 | 3/1972 | Hasten et al. | 425/232 X |
| 3,757,623 | 9/1973 | Wiewel | 83/168 |
| 3,776,671 | 12/1973 | Bruske et al. | 425/311 X |
| 3,782,876 | 1/1974 | Groff | 425/311 X |
| 3,867,081 | 2/1975 | Everett | 425/311 X |

Primary Examiner—Francis S. Husar
Assistant Examiner—David S. Safran
Attorney, Agent, or Firm—C. E. Tripp; R. B. Catto

[57] ABSTRACT

A vertically disposed nozzle continuously extrudes a descending column or bar of semi-frozen confection which passes through a ring gear. A cutoff wire is anchored to the ring gear and to a second, laterally adjacent ring gear. Slip rings adjacent the ring gears electrically energize and heat the cutoff wire. Both gears are driven in the same direction, and the anchor points are located to maintain uniform interspacing and thus keep the cutoff wire linear to transversely slice the moving product bar. The gears and cutoff wire are adjustably mounted to be unitarily tilted from the horizontal so that the product bar is repetitively severed along parallel lines to produce slices each having uniform thickness, with the severance lines perpendicular to the side surfaces of the product bar. A wiper is arranged to clean the cutoff wire after each cutting stroke so that the product will not accumulate and burn onto the cutoff wire.

12 Claims, 14 Drawing Figures

FIG_3

FIG_11

APPARATUS FOR CUTTING SLICES OF SEMI-FROZEN FOOD PRODUCTS

BACKGROUND OF THE INVENTION

The field of the present invention concerns frozen confection machines for producing ice cream bars and the like, and more specifically concerns prior art confection apparatus of the general type disclosed in the Komberec U.S. Pat. No. 3,280,763, issued on Oct. 25, 1966. In the patented device, three laterally adjacent extrusion nozzles decline from the horizontal, with the discharge ends of the nozzles overlying a conveyor having trays for receiving a semi-frozen confection continuously pumped from each nozzle in the form of an extruded column or bar. In order to slice the bar extrusions into appropriate tray lengths, a heated cutoff wire extends transversely over the conveyor and periodically descends to sever all three columns of the extruded product. Because there is a gap between adjacent trays to receive the product, the nozzles are mounted for horizontal movement and retract after a cutting operation. Thus, the nozzles initially advance in the direction of conveying movement so that the velocity of the product bar through the nozzles, plus the velocity of the nozzles themselves, is approximately equal to the tray velocity. Then the cutoff wire is swung downward to sever the extruded product bar, and retracted, following which the nozzles rapidly return to their upstream position for filling the next tray.

It can be appreciated that the combined reciprocating, oscillating and intermittent motions employed in the patented structure for coordinating the movements of the nozzles, cutoff wire and receiving trays are more complex than if the same functions might be effected with only rotary motion, and would be expecteed to require more operating components than mechanisms operating only with rotary motion. A basic object of the present invention is to provide a machine for producing slices of semi-frozen food products or the like with a fixed extrusion nozzle by slicing the moving product bar extruded from the nozzle with a heated cutoff wire having continuous rotary motion. The term slice, within the context of that term as used herein, is intended to include slices made from an extruded food product bar or the like of any cross-sectional configuration.

It is known in the prior art concerning masonry bricks to cut plastic clay material with a cutting wire mounted between two driven ring gears so arranged that the wire remains taut as the gears rotate in the same direction. This operating principle is disclosed in the Freese U.S. Pat. No. 507,798, issued on Oct. 31, 1893, for a BRICK OR TILE MACHINE. Two overlapping ring gears, rotatable abut generally horizontal axes, carry two cutting wires movable down through the gap between two horizontal conveyors. A continuous column or bar of plastic clay from an extrusion head is conveyed horizontally through one of the ring gears, and the cutting wires alternately sever the bar between the conveyors into individual bricks for subsequent firing in a kiln. In order to produce square cuts in the continuously moving bar of clay, the ring gears are inclined from the vertical so that each cutting wire, as it is moved down through the clay bar, also has a component of motion in the direction of bar motion. The horizontal motion of the cutting wire, during cutting, equals the horizontal motion of the clay bar during cutting. As a result, there is no relative horizontal motion between the wire and the moving clay bar and each cut lies in a vertical plane relative to the horizontally moving bar of clay. This principle is employed in the present invention, but the extrusion is moving down and is not supported on conveyors that prevent displacement of the product by the cutting wire.

Another prior art U.S. Pat. No. 3,554,138 to Glass issued on Jan. 12, 1971, discloses a frozen confection machine using an extruding nozzle and either a hot wire or a blade cutoff device to slice the extruded, semi-frozen product bar below the nozzle. One disadvantage of this cutoff device is that the heated wire or blade swings about the axis of a single support post, and thus has an unsupported free end. Because of this, the wire must be relatively large in diameter, or the blade wide, in order to resist flexure. In either case, the cutting is effected solely by lateral motion of the cutting member, and with relatively large frictional contact of the cutting member with the product. It has been found that with this arrangement, an indent will be formed in the product where the cutting member enters the product bar, and that a protrusion will be formed where the member exits. In other words, a severed slice will not have sharp corners where the cutting member enters and exits, and this is noticeable in the final product.

Another extrusion-type of confection machine presently in commercial use employs two opposed rotary cutting members having free ends which meet at the center of the product, and this results in a raised central ridge on the upper side of the slice, and a trough on the underside. Thus, if the objective is to attain planar surfaces where the cutting members slice the product, the dual cut is no more effective than the device disclosed in the Glass patent, supra, and also produces the unsharp corners or edges, as previously described.

It is to be noted that the cutting motion employed in the Glass and Komberec patents is what may be termed a pushing and wiping motion, since the cutoff member moves primarily in only one direction (laterally) and tends to push the product inward at initial contact, and to wipe the product outward at the point the cutting member exits.

SUMMARY OF THE INVENTION

In contrast to the pushing and wiping type of cutting action in these prior art frozen confection devices, the heated cutoff wire incorporated in the present invention operates with both lateral and endwise motion. The cutoff wire thus advances in the manner of a saw stroke, and because of this and the relatively small size of the cutoff wire, produces slices having relatively sharp corners, even at high production rates in the order of 150 three inch slices per minute. It would be expected that as the production rate increases (up to the output of 150 cuts per minute) and the cuts have to be performed faster, that more of the confection will be displaced by the cutoff wire entering and leaving the product, and that the corners will be increasingly rounded off or deformed, because there is obviously some degree of pushing action by the cutoff wire when it slices through the product.

On the contrary, an unexpected result has been that as the production rate increases, the corners become increasingly sharper. This improved cutting phenomenon has been found to result from the combined following enumerated structural and functional provisions:

1. The cutoff wire has both endwise and sidewise motion.
2. The cutoff wire is wiped clean after each cut, to prevent "burn-on" of the product.
3. Because the cutoff wire is cleaned as in (2) very little heat is required or necessary.
4. Because the cutoff wire is cleaned after each cut and because minimum heat is required, the wire can be of very small gauge, (about 24 gauge) so that the product offers very little resistance to passage of the wire therethrough.
5. The cutoff wire is small and cuts so rapidly (the wire effects a three inch cut in about 0.042 of a second at a production rate of 150 slices per minute) that it prevents reconsolidation of the slice with the extrusion during the slicing operation.

Another reason for the improved results is that the relatively small friction between the cutoff wire and the product, the force exerted on the product by the wire does not overcome the inertia of the product. The product is not laterally displaced, even when there is a high relative velocity between the cutoff wire and the product.

Another feature of the present invention is related to the fact that many presently produced frozen confections are formed from plural extrusion nozzles, so arranged that different patterns, colors and flavors are contained within its outline, and some extrusions are contoured to form a figure such as a heart, clown face, or the like. Nozzles of these types are disclosed in the Nelson et al U.S. Pat. No. 3,196,809 issued on July 27, 1965, and the Fox U.S. Pat. No. 3,522,775 issued on Aug. 4, 1970. Because the improved cut is made with very little of the wiping and pushing action that is prevalent in prior art cutting devices, the individual patterns are prevented from blurring into adjacent patterns, and the intended lines of demarcation between colors, etc. are preserved. Also, some extrusions have longitudinally corrugated or otherwise decorative outer surfaces, and these surfaces are not deformed by the present cutoff mechanism because it produces square edges. To summarize, the slice forming apparatus of the present invention provides a product that is not distorted or marred by the slicing operation, even when the apparatus is operated at the maximum production rates currently employed in the industry. In fact the apparatus of the present invention has a potential operation at production rates in excess of the highest rates presently provided.

DESCRIPTION OF THE PREFERRED EMBODIMENT

Figure 1:
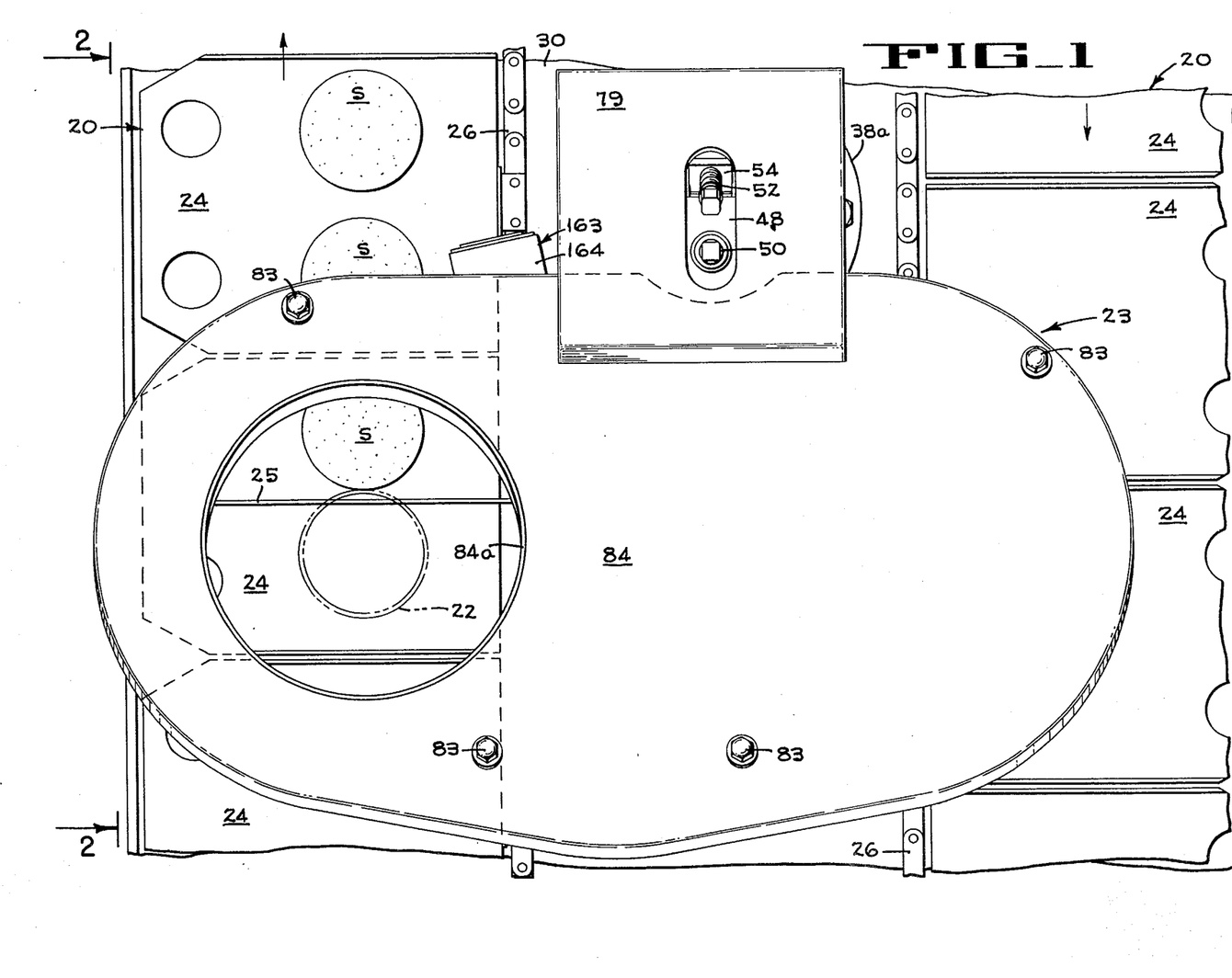
FIG. 1 is a top plan of the slice forming apparatus of the present invention, and includes a fragmentary portion of a cold plate takeaway conveyor for receiving the slices.
Figure 2:
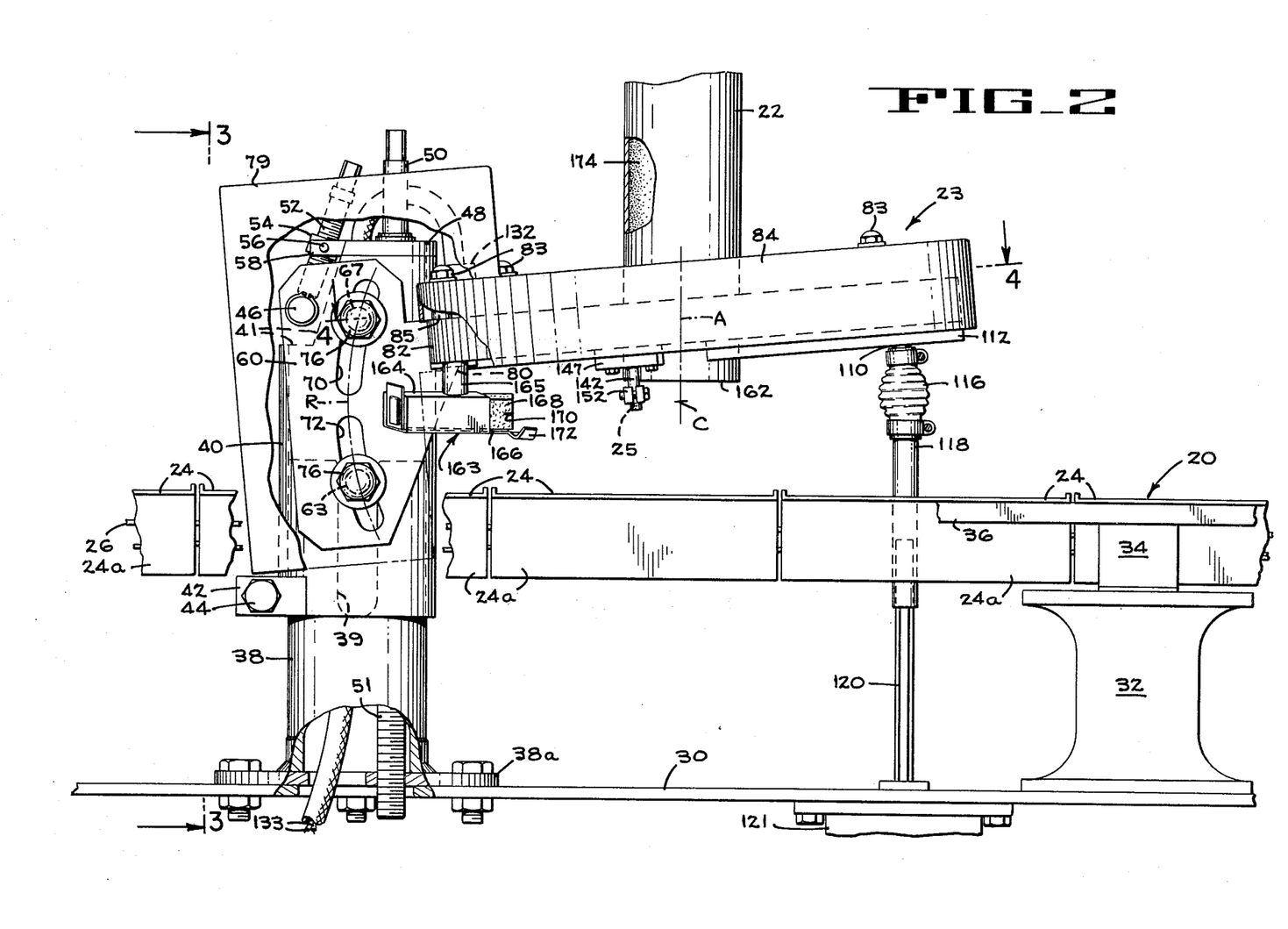
FIG. 2 is a side elevation viewed in the direction of the arrows 2—2 on FIG. 1, and is partially broken away to show structure which would be otherwise concealed.

The apparatus illustrated in FIGS. 1 and 2 includes a cold plate product conveyor 20 which is known per se in the prior art, for example, in the Glass U.S. Pat. No. 3,648,625 issued Mar. 14, 1972, and U.S. Pat. No. 2,887,855, issued May 26, 1959. In the present system for producing frozen bar type confections, one run of the cold plate conveyor 20 extends under a vertically adjustable extrusion nozzle 22 (FIG. 2), the extrusion nozzle being indicated in phantom in FIG. 1. The nozzle 22 extrudes a column or bar of semi-frozen ice cream or the like through a cutoff unit 23 having a heated resistance wire 25. The wire produces individual slices S that are deposited on a plurality of pivotally connected cold plates 24 of the product conveyor, which plates are connected to a continuously driven side chain 26. The cold plates 24, each carrying a frozen confection S advance through a freezing tunnel, not shown, and return on the other run of the conveyor 20 for packaging and discharge from the machine. Prior to packaging, and depending upon the type of confection being produced, the confections pass through various stations where a stick may be inserted, the confections may be dipped in and coated with chocolate or the like, or other optional processing steps may be taken.

The present invention concerns the cutoff unit 23 which repetitively slices the continuous vertical extrusion of semi-frozen confection issuing from the nozzle 22 and produces uniform slices S of confection. The top and bottom faces of these slices are parallel and are in horizontal planes. The sliced faces make sharp, 90° corners with the edge wall of the slices and the slices are produced at relatively high output rates, with continuous rotary motion of the slicing mechanism, and with continuous linear motion of the cold plate conveyor 20.

With reference to FIG. 2, the conveyor 20 is mounted above a frame plate 30 by means including a pedestal 32 which supports a bracket 34 to which is secured a support track 36. The track 36 supports one side of the cold plates 24, and is preferably formed of a plastic having a low coefficient of sliding friction. The other sides of the cold plates 24 have depending side flanges 24a which are mounted along one side of the chain 26. A detailed description of the conveyor 20 is not necessary, since the conveyor details are not critical to the present invention, and other known conveyors may be used in lieu of the conveyor 20.

Supporting the cutoff unit 23 at the far side of the conveyor 20, as viewed in FIG. 2, is a hollow support column 38, which is provided with a base flange 38a bolted to the frame plate 30. The upper end of the column 38 is bifurcated to provide diametrically opposed slots 39 (see also FIG. 3). Telescoped over the column 38 is a tubular mounting sleeve 40 which has a slit 40a (FIG. 3) and is provided with bosses 42 straddling the slit and clamped together with a clamping bolt 44 to compress and lock the sleeve 40 at an adjusted elevation on the support column 38.

The upper end of the tubular sleeve 40 is relieved or cut away along the surfaces 41 (FIGS. 2 and 3) to provide clearance for a cross shaft 46, to be described presently. A top cap 48 is welded to the upper end of the sleeve 40. In order to provide vertical adjustment of the sleeve 40 on the column 38, a rotatable height adjusting shaft 50 is axially restrained in the cap 48 by collars and the shaft has a lower portion 51 (FIG. 3) threaded through the base flange 38a. Thus, loosening the clamping bolt 44 and rotating the shaft 50 by a removable handle, not shown, which is engaged with a square upper end of the shaft, will positively elevate or lower the tubular sleeve 40. This elevational adjustment is for the purpose of minimizing the distance the slice will fall, and does not alter the thickness of the slices. Slice thickness changes can be made by altering the extrusion rate, or by changing the velocity of the cutoff wire, as will later be described.

The cross shaft 46 (FIG. 3) is provided with a central aperture in which the unthreaded lower end of an angle adjustment bolt 52 is axially held by snap rings. The body of the bolt 52 is threaded through a block 54 which is mounted by trunnions 56 in spaced projecting ears 58 that are part of the cap 48. A square upper end of the angle adjusting bolt 52 can be turned with the previously mentioned removable handle to raise or lower the cross shaft 46. The cross shaft 46 is pivotally mounted in two spaced side plates 60 which straddle the tubular sleeve 40 and, as later described, support the cutoff unit 25. The function of the angle adjustment bolt and cross shaft construction 52, 60 just described is to provide for angular adjustment of the side plates 60 and the cut off unit 23 that projects from the plates.

To prevent relative rotation between the support column 38 (FIG. 3) and the tubular sleeve 40, a tubular spacer 62 is mounted on a locking bolt 63. The spacer has enlarged end flanges 64 which are disposed in apertures in the sleeve 40, and the body of the spacer is disposed within the notches 39 that are formed in the support column 38.

Figure 3:
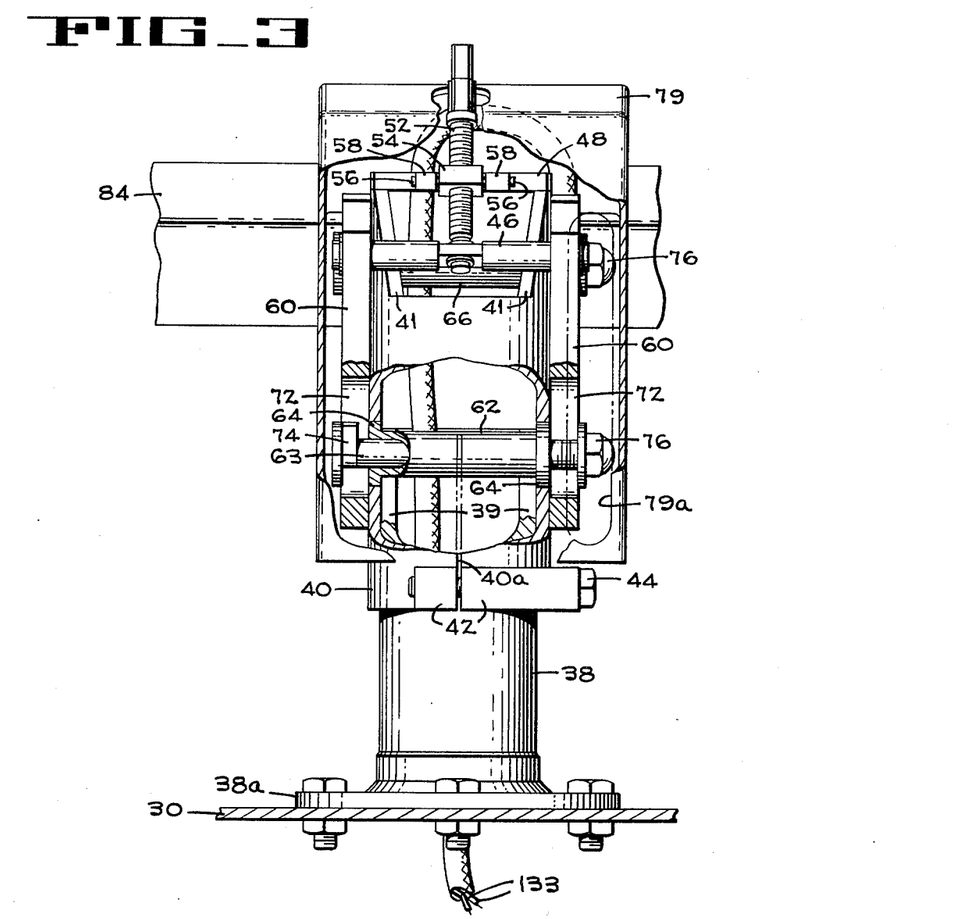
FIG. 3 is a vertical section taken along lines 3—3 on FIG. 2, and is partially broken away.
Figure 4:
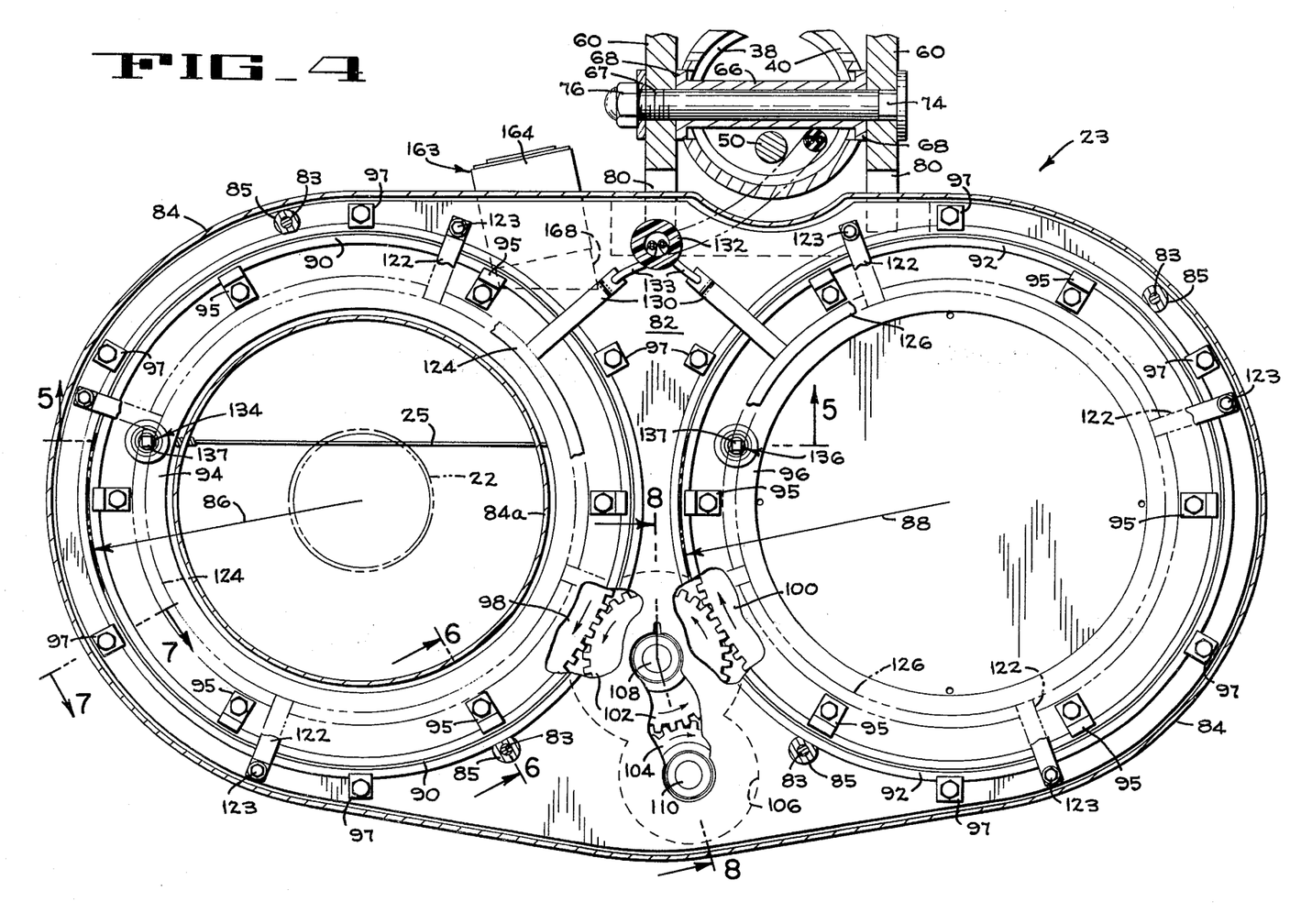
FIG. 4 is an enlarged generally horizontal section taken along lines 4—4 on FIG. 2.

Referring briefly to FIG. 4, above the spacer 62 is a second spacer 66, mounted on a locking bolt 67, having enlarged end flanges 68 located in apertures in the tubular sleeve 40. The end portions of the upper locking bolt 67 extend through an arcuate slot 70 in each head mounting plate 60, as best shown in FIG. 2 for the near plate 60, and the lower locking bolt 63 (see also FIG. 3) extends through an arcuate slot 72 in each head mounting plate. As shown in FIG. 2, the arcuate slots 70 and 72 in each head mounting plate 60 lie on a common circular arc R which is generated from a center C. The vertical axis A of the extrusion nozzle 22 intersects an imaginary horizontal line that extends between the two centers C (one for each head mounting plate 60). This feature, as later described in conjunction with FIG. 11, assures that altering the angular disposition of the cutoff unit 23 changes only the plane of the cut of the slices made by the cutoff unit without affecting the center thickness of the slices.

Each of the locking bolts 63 and 67 is provided with an integral guide block 74, under its head, which is located in a slot 72 or 70 and which is elongate in the direction of the slot to prevent the associated bolt 63, 67 from turning when an acorn nut 76 is turned on the other end of the bolt. If the nuts 76 (FIG. 2) are loosened and the angle adjusting bolt 52 is turned, the cross shaft 46 is elevated or lowered, as the case may be, and the two head mounting plates 60 move along the arc R, and the axis of rotation of the cutoff unit 23 coincides with the centerline C. Referring to FIG. 2, the plane of motion of the cut off wire 25 passes through the centerline C. Thus when the wire 25 is centered on the axis A of the extrusion nozzle 22, the wire coincides with the centerline C. Thus angular adjustment of the cutoff unit does not change the spacing of the wire from the discharge end of the nozzle when the wire is centered, as aforesaid. As shown in FIGS. 1–3, the upper end of the support column assembly is covered by a sheet metal box 79 to enclose the described cutoff head adjusting and mounting mechanism. An aperture 79a (FIG. 3) provides access to the acorn nuts 76.

Figures 5, 5A, 6, 7, 8:
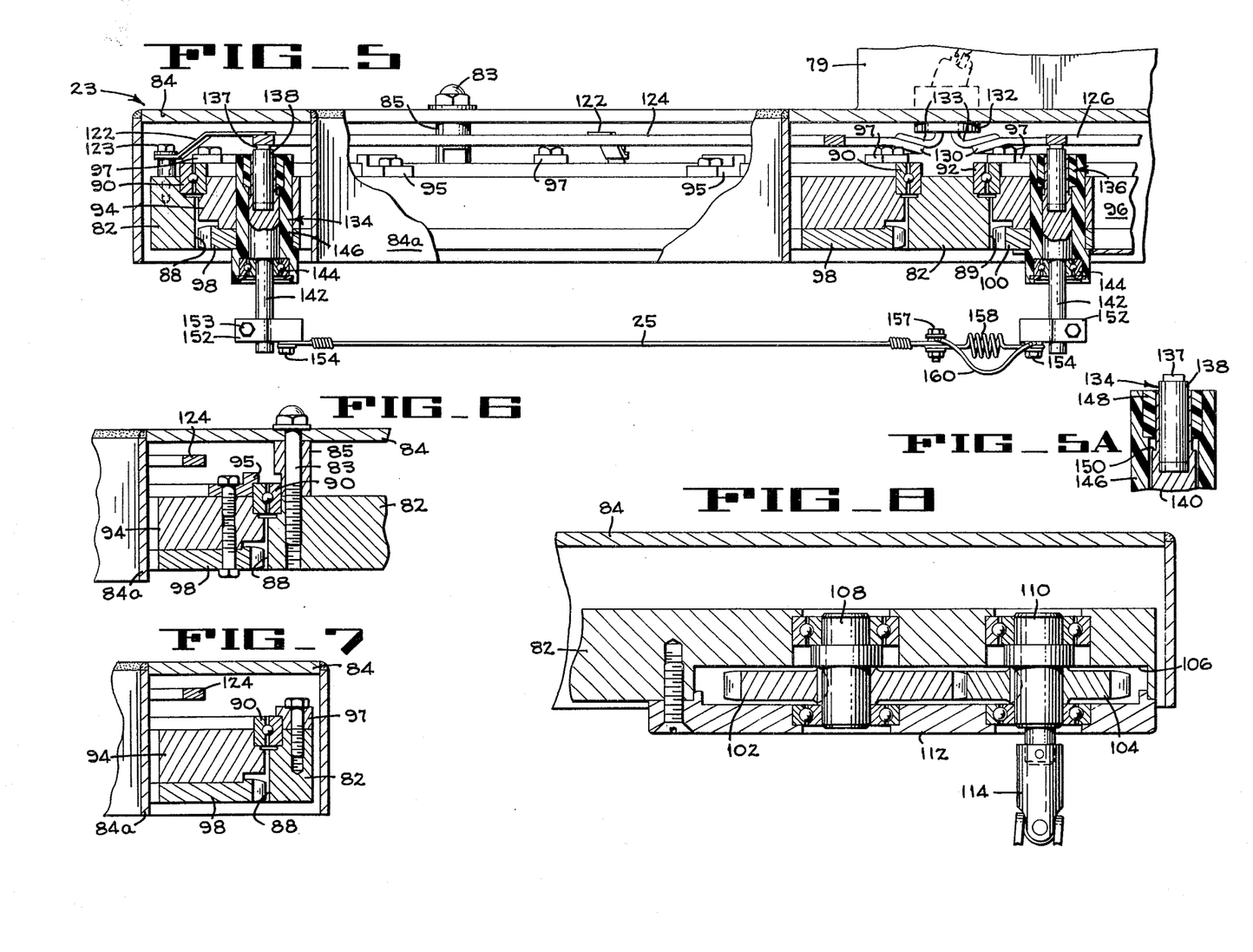
FIG. 5 is an enlarged vertical section taken along lines 5—5 on FIG. 4.
FIG. 5A is an enlarged fragmentary section of an electrical brush shown in FIG. 5.
FIG. 6 is an enlarged vertical section taken along lines 6—6 on FIG. 4.
FIG. 7 is an enlarged vertical section taken along lines 7—7 on FIG. 4.
FIG. 8 is an enlarged vertical section taken along lines 8—8 on FIG. 4.

In FIG. 2 it will be seen that the near side head mounting plate 60 (the concealed plate 60 is of the same profile) has a projecting ledge portion 80 forming a support shelf for a base plate 82 that is welded thereto (and to the other plate 60) and forms the main framepiece of the cutoff unit 23. A sheet metal shroud 84 encloses the top and edge portions of the base plate 82 and is removably held to the base plate by bolts 83 and spacers 85 (FIGS. 4 and 6). As shown in FIGS. 1, 4 and 5, the shroud 84 is provided with an annular flange 84a which circumscribes an aperture aligned with the extrusion nozzle 22. The outer edge of the base plate 82 follows the contour of the shroud 84, and the plate is provided with large side by side circular apertures 86 and 88 of equal size, indicated by the radial dimension lines of the same numbers. The upper portion of the base plate 82 (FIG. 5), around the apertures 86 and 88, carry the outer races of ball bearings 90 and 92, respectively. The inner races of the bearings 90 and 92 are secured by brackets 95 (FIGS. 4 and 6) to gear mounting rings 94 (FIGS. 5, 6 and 7) and 96 (righthand side of FIG. 5). The rings 94, 96 respectively carry ring gears 98 and 100 on their undersides. Brackets 97 (FIGS. 4 and 7) hold the outer races of the bearings 90, 92 to the base plate 82.

The ring gears 98 and 100 (FIG. 4) are meshed with a common idler gear 102 (FIGS. 4 and 8) so that the ring gears counterrotate. Idler gear 102 and an adjacent drive gear 104 meshed therewith (FIG. 4) are mounted in a gear chamber or recess 106 (FIG. 8) in the base plate 82. Upper and lower bearings for stub shafts 108 and 110 carrying the idler and drive gears are mounted in the base plate 82 and in a cover plate 112. A universal coupling 114 (FIG. 8) is connected to the lower portion of the shaft 110 and is enclosed in a sealing boot 116 (FIG. 2). The lower end of the coupling carries an internally splined sleeve 118 (FIG. 2) which is coupled to a splined shaft 120 driven by a variable speed drive 121 which is coupled to and timed with the drive (not shown) for the conveyor 20. This makes it possible to synchronize the positions of the cold plates 24 (FIG. 1) with the slices S as they are cut off and dropped onto the plates. The splined and universally coupled drive train accommodates the previously described tilting and height adjustment of the cutoff unit 23 without interrupting driving motion of the ring gears 98 and 100.

If the slices are to be made thicker (for example) and if the production rate of slices per minute is to be maintained at its previous value, both the cutoff wire and the conveyor 20 will be operated at their previous speeds. However, the extrusion is pumped faster through the nozzle 22. As will be explained presently, this will require increasing the tilt of the cutoff head 23. If the production rate can be reduced when thicker slices are required, the extrusion rate need not be increased but both the orbital speed of the cutoff wire 25 and the linear speed of the conveyor 20 must be reduced.

Returning to FIGS. 4 and 5, the base plate 82 is provided with radially inwardly projecting, upwardly offset arms 122, surrounding the base plate apertures 86 and 88, which arms support slip rings 124 and 126, respectively. The arms 122 are electrically insulated from the bolts 123, which mount the arms on the base plate 82, by means of insulating washers and sleeves. At about the 2 and 10 o'clock positions on the slip rings 124 and 126, as viewed in FIG. 4, arms 130 are connected to the slip rings for conducting electrical energy to each slip ring. These arms terminate near an electrical insulating bushing 132 carrying electrical wires 133 which are connected to the arms 130.

As shown in FIG. 5, the undersides of the slip rings 124 and 126 are engaged by electrical brush assemblies 134 and 136 which respectively extend through the gear mounting rings 94 and 96, and through the ring gears 98 and 100. These brush assemblies are associated with shafts which mount the cutoff wire 25 in the ring gears 98, 100 and provide current for heating the wire.

The brush assemblies are insulated from and rotate with the ring gears and gear mounting rings, clockwise as viewed in FIG. 4. It will be noted that each brush assembly 134 and 136 has the same angular relation with the rotational axis of its associated ring gear, and the distance between the brush assemblies does not change because the ring gears 98 and 100 are of equal size and are in constant mesh with the idler gear 102.

Both brush assemblies 134 and 136 (FIG. 5) are mounted in the same manner, and the following description is applicable to the associated parts of either assembly. Each brush assembly is a commercially available item having a carbon brush 137 (FIG. 5A) spring-urged upwardly (spring not shown) from a tubular metallic casing 138. The casing 138 is mounted in an axial recess of a rotatable metal shaft 140 having a depending wire mounting post 142 (FIG. 5) of reduced diameter extending through a ball bearing 144. Thus, the shafts 140 are electrically energized via the slip rings 124, 126. A snap ring retains each bearing 144 in the lower-end recess of an associated plastic insulating sleeve 146. One sleeve is fitted into aligned apertures in the ring gear 98 and its mounting ring 94, and the other sleeve is similarly mounted in the ring gear 100 and its mounting ring 96. The lower end of each sleeve 146 includes a mounting flange 147, which flange is elongate in a circumferential direction (relative to the ring gear) as seen in FIG. 2. The sleeve flange is bolted to the associated ring gear 96 or 98 (FIG. 5). Each sleeve 146 and all its internal components may thus be removed and replaced as a unit. The upper end of the outer insulating sleeve 146 (FIG. 5A) is recessed for the installation of a plastic bearing 148 that lies above a shoulder portion 150 of the shaft 140. The shaft 140 is pressed into the bearing 144 so that it is locked axially.

In order to mount the cut off wire 25 on the two posts 142 (FIG. 5), a split clamp 152 (split shown in FIG. 2) is locked in place on each post by a bolt 153. Each clamp mounts an anchor bolt 154. One of the bolts 154 (the lefthand bolt in FIG. 5) directly secures the looped end of the resistance or cutoff wire 25; the other looped end of the wire 25 is fastened by a bolt 157 to a tension spring 158 that is in turn secured to the other clamp 152 by the other anchor bolt 154. In order to assure adequate electrical current supply to the cutoff wire 25, the bolt 157 and the adjacent bolt 154 are connected by a copper wire 160 bridging the spring 158. The spring maintains the cutoff wire taut.

Figure 9:
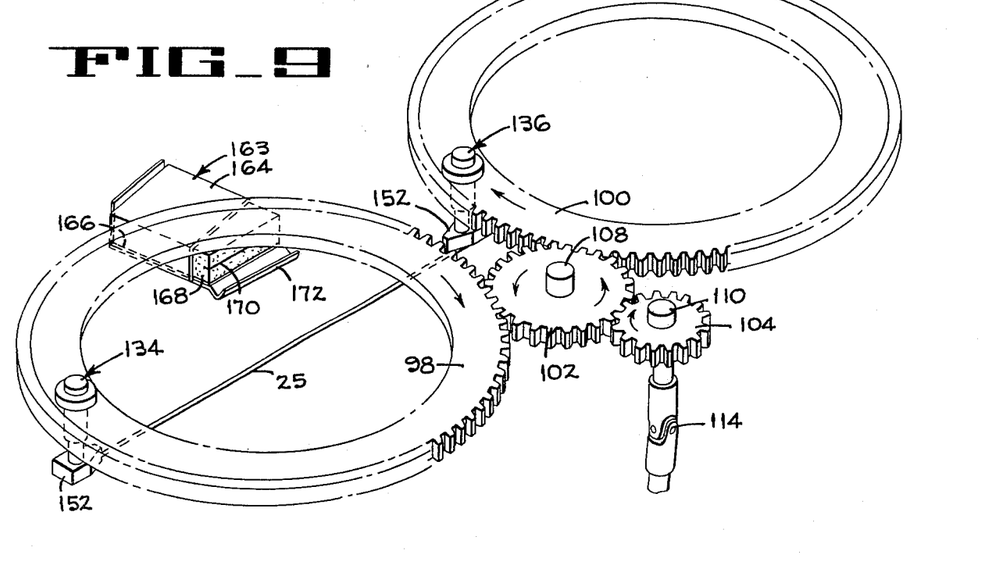
FIG. 9 is a diagrammatic perspective illustrating the major operating components of the apparatus shown in FIG. 4.
Figure 10:
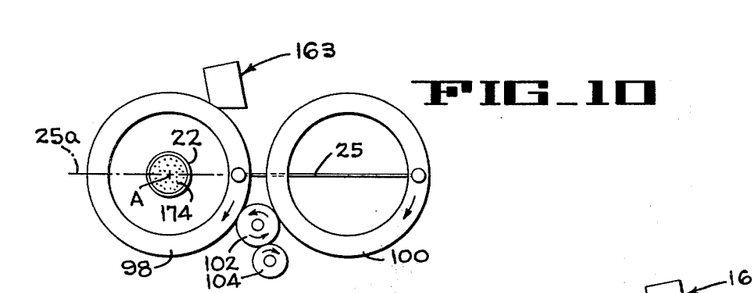
FIGS. 10, 10A and 10B are reduced scale diagrammatic plan views illustrating successive operating positions of the structure shown in FIG. 9.
Figure 10A:
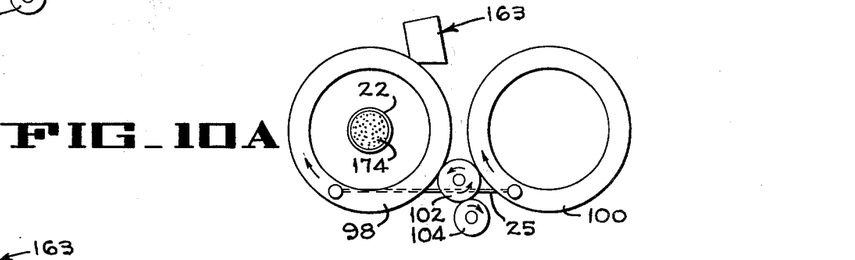
Figure 10B:
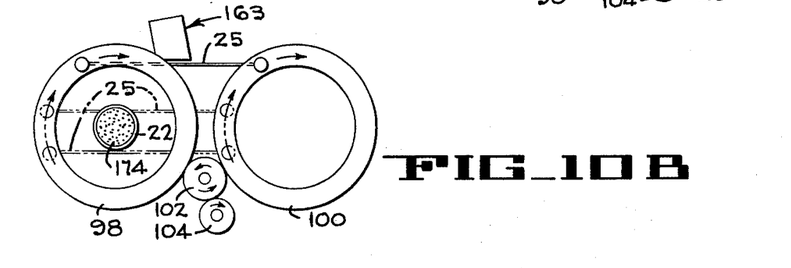

The wire clamps 152 are adjusted on their posts 142 so the cutoff wire 25 lies in a plane that is parallel to that of the ring gears 98, 100 and passes through the pivot axis of the head 23, shown in FIG. 2. Accordingly, since the cutoff unit 23 tilts about the imaginary horizontal axis C, tilting of the unit 23 about the axis C will not change the spacing of the cutoff wire 25 from the end of the nozzle 72 when the wire 25 is centered at the axis A of the nozzle. The aforesaid centered condition of the wire 25 is illustrated in FIGS. 9 and 10. In FIG. 9 the wire is centered over the axis of the extrusion nozzle (not shown). In FIG. 10 the wire 25 is centered over the axis of ring gear 100, but the projection 25a of the wire will intersect the vertical axis A of the extrusion nozzle 22.

FIGS. 2, 4 and 9 show a wiper-sponge unit 163 which cleans the cutoff wire 25 after each slice is made. As shown in FIGS. 2 and 4, an open-ended rectangular sheet metal housing 164 depends from a post 165 (FIG. 2) secured to the base plate 82, and is provided with a removable drawer 166 which seats against the end of the housing in which it is inserted. The drawer carries a sponge cartridge 168 in a position where the cutoff wire 25 will be drawn across the free end of the sponge and through a slot 170 (FIG. 9) which the wire itself cuts into the sponge when the cutoff unit is initially placed in operation. The sponge thereafter has substantially entire circumferential contact with the wire, and wipes whatever residue of product may be on the cutoff wire. This prevents the product from burning onto, and accumulating on, the cutoff wire. This preserves the previously mentioned advantage of employing a small diameter cutoff wire, and further assures that the exterior of the wire does not become thermally insulated by burning on of a coating of product. In order to carry off the product removed by the sponge, a trough 172 is formed integral with the sheet metal housing 164 to divert the melted product to the right in FIGS. 4 and 9, away from a position where it might drop onto the cold plate conveyor 20. When the sponge cartridge 168 becomes worn beyond usefulness, a new cartridge and drawer assembly 166, 168 is inserted.

Figure 11:
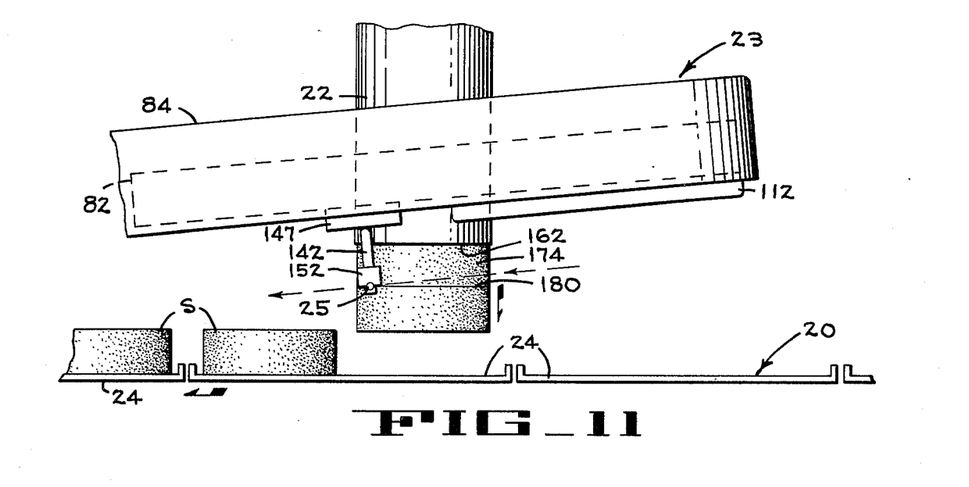
FIG. 11 appears on the sheet including FIG. 3 and is a diagrammatic elevation, similar to a portion of FIG. 2, illustrating the operational principles of the slice forming apparatus.

FIG. 11 pictorially summarizes the operating principle, and is viewed perpendicular to the line of movement of the cold plates 24, which are advancing from right to left, as is the heated cutoff wire 25. An extruded column 174 of semi-frozen product is issuing from the lower end 162 of the extrusion nozzle 22. The extrusion nozzle is vertically adjustable, by means not shown, so that the slices have minimal fall to the cold plates 24. The cutoff wire 25 is then vertically adjusted for height by turning the adjusting shaft 50 (FIG. 2) that the wire will pass through the extruded product close to the lower end 162 of the nozzle 22.

With the product being pumped through the nozzle 22 and the conveyor 20 and cutoff unit 23 in operation, the angle adjusting bolt 52 (FIG. 2) is turned to tilt the cutoff unit 23. At some tilt angle of the cutoff unit, slices S will be obtained wherein the sliced faces are perpendicular to the nozzle axis A, and hence are parallel to the cold plates 24. This means that the slices are rectangular in profile, as viewed in FIG. 11. The cutoff unit 23 is adjusted, by trial, until the lateral movement of the cutoff wire (the wire is also moving endwise) and the velocity at which the product column 174 is extruded result in a severance line 180 which meets the abovesaid conditions. Once these adjustments are made, prolonged production runs can be carried out with little attention, and the slices S will have uniform dimensions, sharp corners, and no blurring among multiple colors, if used.

Although the best mode contemplated for carrying out the present invention has been herein shown and described, it will be apparent that modification and variation may be made without departing from what is regarded to be the subject matter of the invention.

I claim:

1. Apparatus for forming slices of a food product such as semi-frozen ice cream or the like, comprising:
   a. a vertical axis extrusion nozzle for extruding a substantially vertical column of the product;
   b. a first rotatable member comprising an annulus that surrounds the lower end of said nozzle;
   c. a second rotatable member laterally adjacent said first member;
   d. means operatively associated with said rotatable members for driving both members in a common direction and at the same angular velocity;
   e. means for rotatably mounting a wire clamp on each member, the two clamps being equally spaced from the axes of their respective members and being positioned so that the distance between the clamps remains constant during rotation of said members;
   f. a heated cutoff wire anchored to said wire clamps to cut the unsupported extruded product column and sever an individual slice, and
   g. a conveyor movable beneath said nozzle for receiving product slices.

2. Apparatus according to claim 1, wherein said cutoff wire is approximately 24 gauge, slip ring means for conducting electrical current through said wire, and wiper means in the path of movement of said wire for cleaning off the product from said wire between each slicing operation.

3. Apparatus according to claim 2, wherein said wiper means comprises a resilient sponge, and means for mounting said sponge adjacent the path of said cutoff wire in position for said wire to initially cut laterally into said sponge and move gnerally longitudinally through the sponge cut, subsequent contact of the sponge and wire thus assuring that substantially the entire circumference of said wire is wiped by said sponge.

4. Apparatus according to claim 3, wherein said sponge mounting means comprises a fixed housing having opposed open ends, a drawer insertable to a predetermined position in one open end of housing, and a sponge cartridge mounted on said drawer to project from the other open end of said housing into the path of said cutoff wire.

5. Slice forming apparatus according to claim 1, wherein said members are externally-toothed gears of equal pitch diameter;
   a. means mounting said gears in a common plane which is an inclined plane relative to the horizontal; and
   b. a single driven pinion gear intermediate said gears and in meshed engagement with said ring gears.

6. Slice forming apparatus according to claim 5 and:
   a. a stationary slip ring mounted above each gear;
   b. said means for mounting the cutoff wire clamps including an electrical insulating bushing extending through each gear in an axial direction and a metal shaft rotatable in each bushing;
   c. said shafts projecting from said bushing on the underside of said gears for mounting said cutoff wire clamps; and
   d. a spring biased electrical brush electrically connected to each shaft and extending upward from the associated gear in sliding engagement with the associated slip ring.

7. Apparatus according to claim 5, and:
   a. an upright support column at one side of said conveyor;
   b. a housing for mounting said gears; and
   c. means mounting said housing on said support column for adjustable tilting movement of said housing about a horizontal axis which axis intersects said nozzle axis and which lies in the cutting plane of said cutoff wire.

8. Apparatus according to claim 7, wherein said housing mounting means also includes means for elevationally positioning said housing to alter the spacing between said cutoff wire and the end of said nozzle to control the drop height of the slices.

9. Apparatus for repetitively cutting a semisolid frozen food product into slices comprising:
   a. a vertical axis extrusion nozzle for continuously extruding a substantially vertical descending column of semi-frozen product;
   b. a cold plate conveyor underlying said nozzle;
   c. a pair of spaced coplanar ring gears of equal diameter intermediate said nozzle and said conveyor, the product column moving through one of said ring gears;
   d. a driven idler gear meshed with both ring gears to rotate said ring gears in the same direction;
   e. an electrically insulated depending clamp on each ring gear, the two clamps being located so that the distance between the clamps remains constant as the ring gears rotate;
   f. a cutoff wire extending between and anchored by said clamps;
   g. a stationary, electrically energized slip ring overlying each ring gear;
   h. an electrical brush connected to each clamp and slidably engaged with the associated slip ring to electrically energize said cutoff wire;
   i. means for adjustably positioning the plane of said gears at a selected inclination from the horizontal; and
   j. a resilient wiper sponge mounted in the path of movement of said cutoff wire, said sponge being slotted to envelop said wire.

10. Apparatus for forming slices of an extruded food product comprising a vertical axis extrusion nozzle for extruding a vertical column of the product, first gear means comprising annular gear means surrounding the lower end of said nozzle and having a substantially vertical axis of rotation that is closely adjacent to the nozzle axis, second gear means coplanar with and peripherally spaced from said first gear means, said first and second gear means having the same pitch diameter, an idler gear coplanar with and meshed with both of said gear means, means for driving said idler gear, a wire mounting post rotatably depending from each of said gear means, said posts being positioned on their respective gear means so that the distance between them remains constant during gear means rotation, a cutoff wire extending between said posts, means for connecting a source of electric current to said wire mounting posts, and a horizontal conveyor running beneath said nozzle for receiving product slices cut off by said wire.

11. The apparatus of claim 1, comprising a gear mounting plate having an aperture for receiving said nozzle, means for rotatably mounting said gear means on said plate with said annular gear means at said plate aperture, a plate supporting column at one side of said conveyor, means mounting said mounting plate on said column for tilting motion about a horizontal axis that is below said gear means and below the end of said nozzle, said tilt axis being normal to the direction of conveyor motion and intersecting the vertical axis of said nozzle, and means for mounting said cutoff wire on said posts so that the wire passes through and coincides with said mounting plate tilt axis when the wire intersects the axis of said nozzle.

12. Apparatus for forming slices of an extruded food product comprising a vertical axis extrusion nozzle for extruding a vertical column of the product, a cutoff head comprising first gear means comprising annular gear means surrounding the lower end of said nozzle and having a substantially vertical axis of rotation that is closely adjacent to the nozzle axis, second gear means having the same pitch diameter as said first gear means, an idler gear means meshed with both of said gear means, means for driving said idler gear means, a wire mounting post rotatably depending from each of said first and second gear means, said posts being positioned on their respective gear means so that the distance between them remains constant during gear means rotation, a cutoff wire extending between said posts, a horizontal conveyor running beneath said nozzle for receiving product slices cut off by said wire, means mounting said cutoff head for tilting motion about a horizontal axis that is below said gear means and below the end of said nozzle, said tilt axis being normal to the direction of conveyor motion and intersecting the vertical axis of said nozzle, and means for mounting said cutoff wire on said posts so that the wire passes through and coincides with said tilt axis when the wire intersects the axis of said nozzle.

* * * * *